United States Patent [19]

Tibbet

[11] Patent Number: 5,071,308

[45] Date of Patent: Dec. 10, 1991

[54] APPARATUS FOR LOADING AND CARRYING BOATS

[76] Inventor: James Tibbet, 3917 Coronada Way, Klamath Falls, Oreg. 97603

[21] Appl. No.: 477,040

[22] Filed: Feb. 8, 1990

[51] Int. Cl.⁵ ............................................. B60R 9/00
[52] U.S. Cl. .................................. 414/462; 224/310; 224/316
[58] Field of Search ................ 414/462, 494, 477–480, 414/559, 538; 224/310, 316, 282, 42.08

[56] References Cited

U.S. PATENT DOCUMENTS

| | | | |
|---|---|---|---|
| 2,584,163 | 2/1952 | Squires | 414/462 |
| 2,722,326 | 11/1955 | Conroy | 414/462 |
| 2,753,063 | 7/1956 | Abel | 412/468 |
| 2,985,327 | 5/1961 | Gilkerson | 414/462 |
| 3,435,970 | 4/1969 | Sutton | 414/462 |
| 3,565,271 | 2/1971 | Deck | 414/462 |
| 3,596,788 | 8/1971 | Willie | 414/462 |
| 3,612,314 | 4/1970 | Cooper | 414/462 |
| 3,628,677 | 12/1971 | Cislaw | 414/462 |
| 3,708,081 | 1/1973 | Schladenhauffen | 414/462 |
| 3,716,156 | 2/1973 | Risney | 414/462 |
| 3,734,322 | 5/1973 | Vaillancourt | 414/462 |
| 3,750,812 | 8/1973 | Evans | 414/462 |
| 3,777,921 | 12/1973 | Nelson | 414/462 |
| 3,777,922 | 12/1973 | Kirchmeyer | 414/462 |
| 3,836,029 | 9/1974 | Rudebusch | 414/462 |
| 3,877,594 | 4/1975 | Coakley | 414/462 |
| 3,904,236 | 9/1975 | Johnson et al. | 224/316 X |
| 3,930,584 | 1/1976 | Davis et al. | 414/462 |
| 3,954,199 | 5/1976 | Grove | 414/462 |
| 3,972,433 | 8/1976 | Reed | 414/462 |
| 3,999,673 | 12/1976 | Anderson | 414/462 |
| 4,024,971 | 5/1977 | Rohrer | 414/462 |
| 4,034,879 | 7/1977 | Cudmore | 414/462 |
| 4,058,243 | 11/1977 | Tappan | 414/462 X |
| 4,087,014 | 5/1978 | Schadle | 414/462 |
| 4,113,126 | 9/1978 | Shotwell | 414/462 |
| 4,175,905 | 11/1979 | Garrison et al. | 414/462 |
| 4,234,285 | 11/1980 | Martinez | 414/462 |
| 4,531,879 | 7/1985 | Horowitz | 414/462 |
| 4,953,757 | 9/1990 | Stevens et al. | 414/462 X |

OTHER PUBLICATIONS

*Eide Automatic Boat Loaders*, Recreation Industries Co., Lake Oswego, Oregon 97034.
AWC, Auto Wheel Corp., Grants Pass, Oregon 97527; p. 33 of catalog for Jacks.

Primary Examiner—David A. Bucci
Attorney, Agent, or Firm—David L. Garrison; Paul L. Griffiths

[57] ABSTRACT

A boat loading and storage apparatus comprising a load support frame having forward and rearward end for supporting a boat or similar load above a vehicle. The load support structure includes a pair of spaced apart adjacent telescoping beams adapted to be vertically pivotable, and horizontally rotatable, about a main support frame connected to a middle portion of a vehicle. A vertical support post is pivotally attached to the load supports forward end, and includes a lower end that is pivotally attached to a forward portion of the vehicle. During loading and unloading, the telescoping beams extend forwardly as the vertical support rotates downwardly toward a horizontal position. A pair of axillary supports have a ground contacting end and another end supporting the telescoping beams for supporting the latter. An attachment member is mounted for movement along a support member which in turn is mounted for movement along the telescoping beams. A lifting mechanism raises and lowers the main support frame. A winch is mounted on the main support frame to aid in loading and unloading various loads as well as raising and lowering the load support structure.

10 Claims, 6 Drawing Sheets

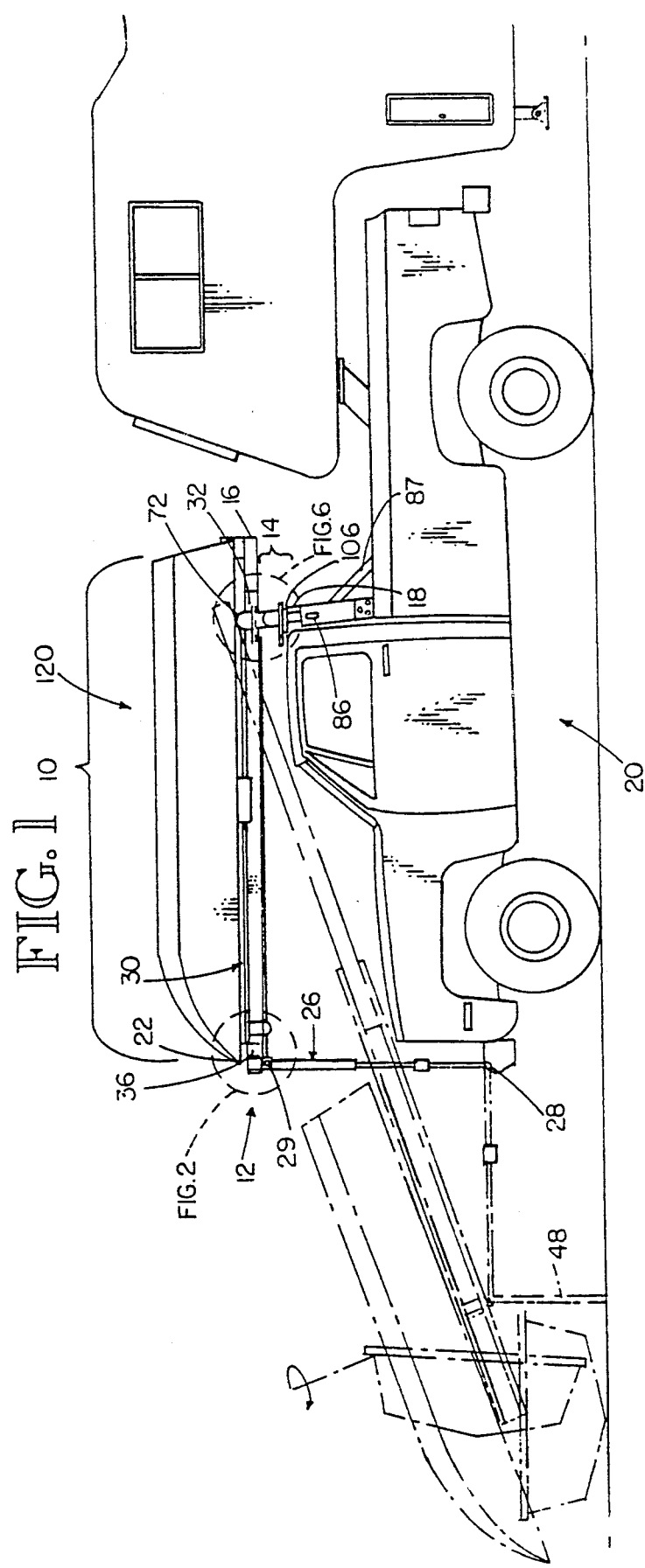

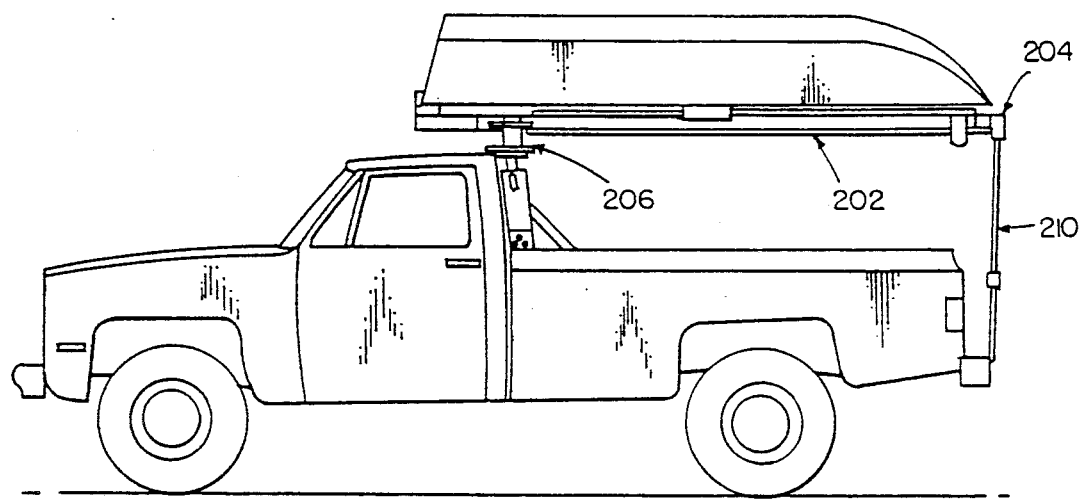
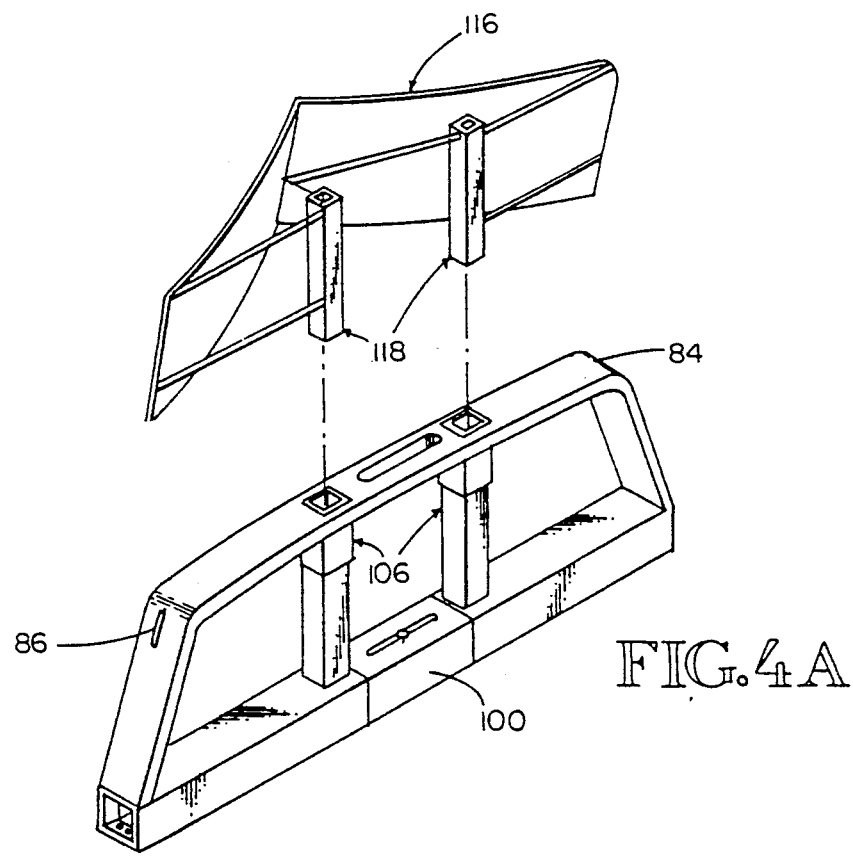

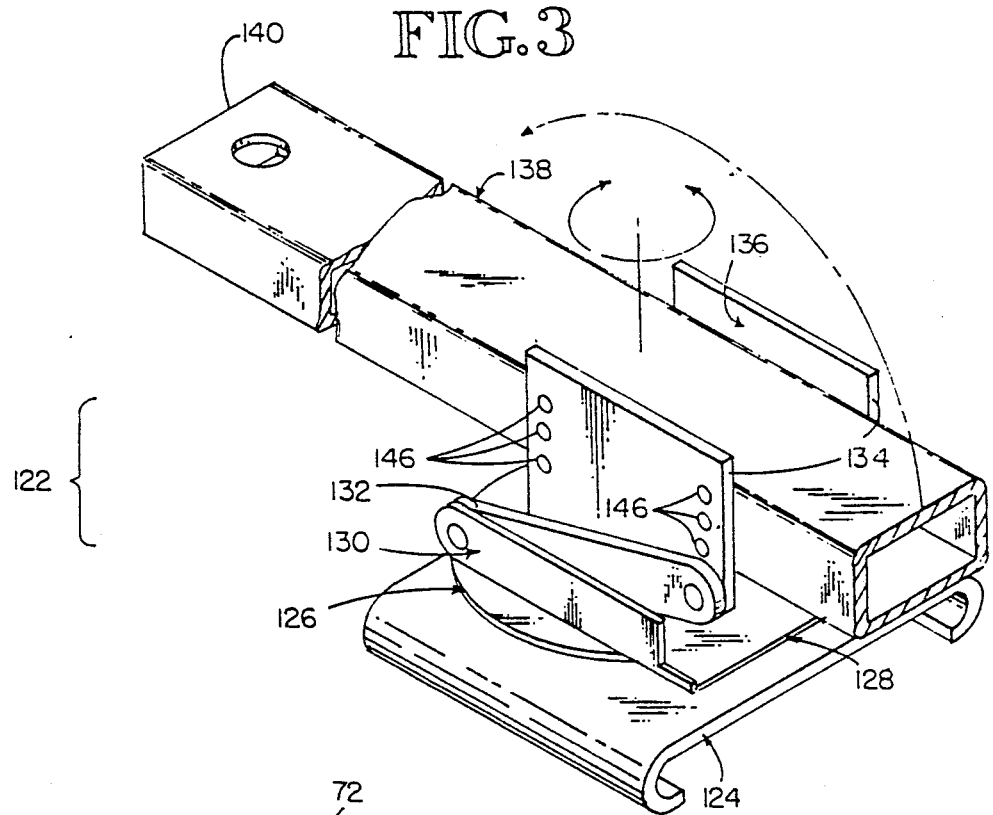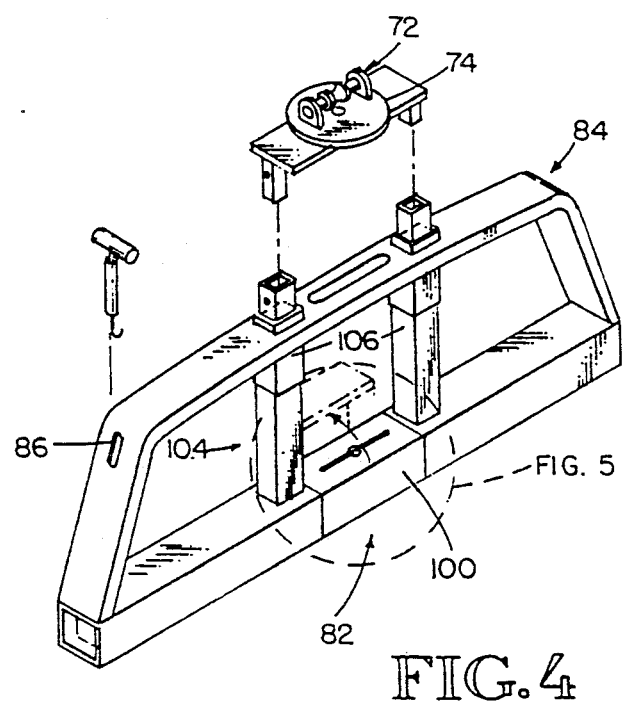

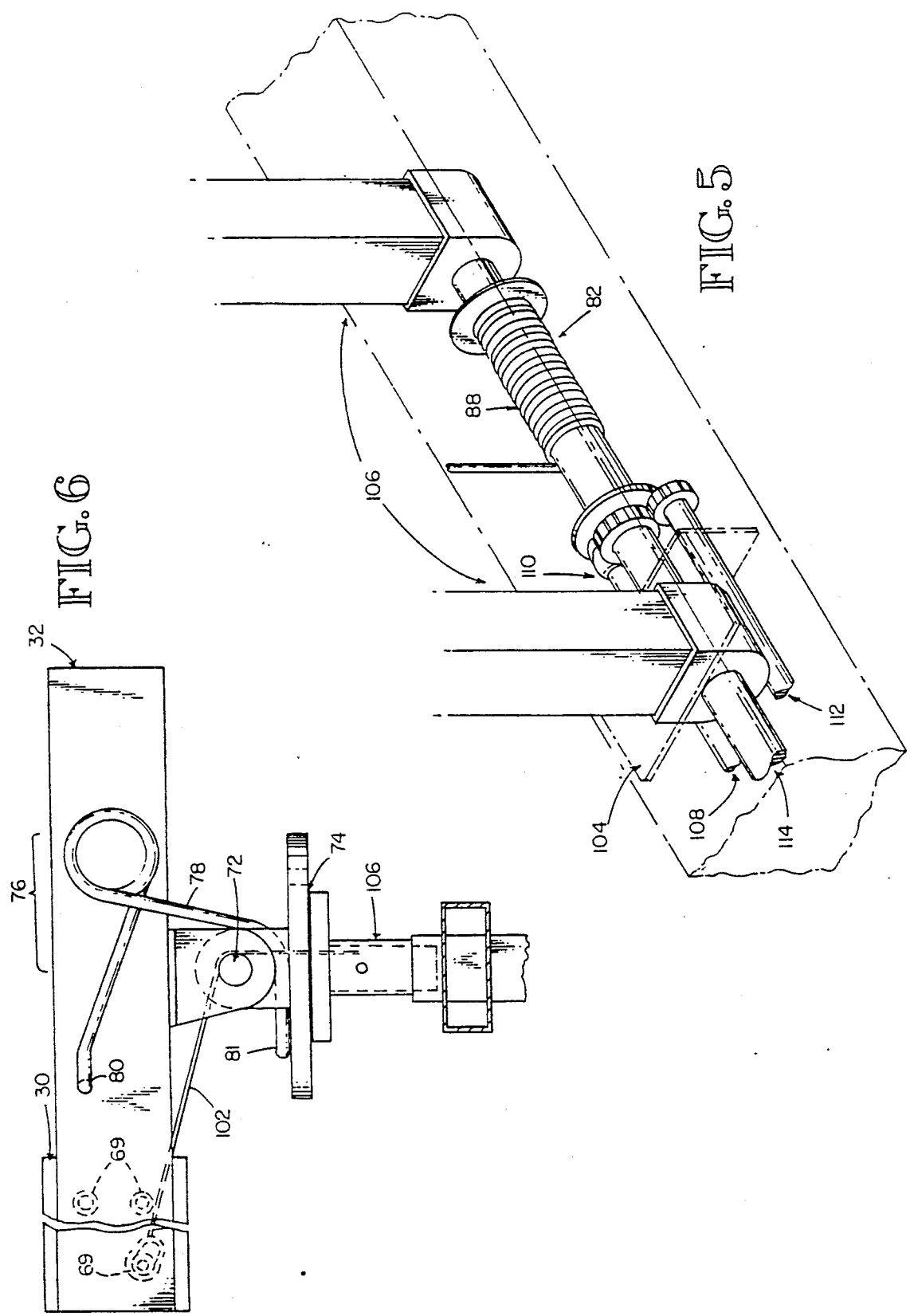

APPARATUS FOR LOADING AND CARRYING BOATS

TECHNICAL FIELD

The present invention relates to devices for loading and carrying loads on vehicles, and, more particularly, relates to a device for loading, unloading, and carrying loads, most commonly boats, on top of a vehicle at its front end using a load support means which allows the load to be moved forward and downward to be unloaded. The invention includes a rearward connecting means that allows the load support means and load to be rotated 360°, and to be loaded and unloaded at different points about the vehicle.

BACKGROUND OF THE INVENTION

A number of devices for loading and carrying boats and other loads on top of vehicles already exist. These devices are designed primarily to be used with trucks and to place the boat or other load over the rear of the vehicles. Several of these devices require frames that interfere with the ability to use the load carrying bed of the trucks in which the devices are installed. For example, these devices cannot be used with a pickup or truck having a fifth-wheel trailer towing configuration. Examples of such devices are disclosed in U.S. Pat. No. 4,034,879 to Cudmore and U.S. Pat. No. 3,972,433 to Reed.

There are also devices which allow the boat or other load to be carried on top of other loads or campers in the load carrying bed of truck. Such a device is disclosed in U.S. Pat. No. 4,175,905 to Garrison. While such devices allow the truck bed to be used, potential problems can occur from overloading the truck at its rear end. Also, by placing the boat or other load above objects in the truck bed, the truck's center of gravity is raised. Use of the truck to tow fifth-wheel trailer is not possible with this type of rear loading boat transport structure.

As illustrated by the present discussion, there are a number of desirable features for an apparatus for front end loading and carrying boats and other loads. It would be desirable to have an apparatus which would allow a boat or other load to be loaded, unloaded, and carried on top of vehicles' front ends. Similarly, it would be desirable to have such a device which would allow one person to load and unload the boat or other load. It would also be desirable to have a device which has an attachment means by which the boat or other load could be loaded and unloaded in different ways and at different points around the vehicle. Further, it would be desirable to have a device which uses a winching means that also could be used to move loads in and out of the truck bed.

Although the discussion herein relates primarily to an apparatus for loading and carrying boats, it is not intended that the invention be so limited. It will be obvious from the description that follows that the present invention will be useful in other applications with problems common to those described herein.

SUMMARY OF THE INVENTION

It is an object of the present invention to provide an apparatus for loading, unloading and carrying boats and other loads above the forward portion of a vehicle.

It is also an object of the present invention to provide an apparatus for loading, unloading, and carrying boats and other loads which uses a telescoping central rail means that allows the boat to slide controllably in a downward and forward direction for unloading.

It is a further object of the present invention to provide an apparatus that is connected to a vehicle with a rearward connecting means which allows the load support apparatus and load to rotate 360°, and to be loaded and unloaded at different points around the vehicle.

It is also an object of the present invention to provide an apparatus for loading, unloading, and carrying boats and other loads which allows one person to operate the apparatus.

It is another object of the present invention to provide an apparatus for loading, unloading, and carrying boats and other loads which uses a winching means both to assist in the loading and unloading of a boat or other load, and to move loads in and out of the truck beds.

It is yet another object of the present invention to provide an apparatus for loading, unloading, and carrying boats and other loads in which a single device with selectable switching means that performs both the lifting and winching functions.

The present invention achieves these objectives and other objectives which will become apparent from the description that follows, by providing an apparatus for loading, unloading, and carrying boats and other loads above the forward portion of a vehicle. A load support means which includes a telescoping central rail means is used. The telescoping central rail means comprises a grooved support member, at least two hollow outer beams slidably located substantially in the grooves of the grooved support member, and at least two inner beams with one inner beam slidably located within each outer beam.

The rearward end of the telescoping central rail means is connected to the vehicle by a rearward connecting means which has a substantially horizontal pivoting means and a substantially vertical pivoting means, and allows the lead support means and load to be rotated 360°, and to be loaded and unloaded at different points around the vehicle. The rearward connecting means is attached to a lifting means, which raises the rearward end of the telescoping central rail means for loading and unloading and lowers the rearward end for transport thereby lowering the center of mass and wind resistance of the loaded vehicle.

The forward end of the telescoping central rail means is pivotally attached to a substantially vertical support member, which, in turn, is pivotally attached to the forward end of the vehicle. Auxiliary support legs are pivotally attached substantially near the upper end of vertical support member. The boat or other load engages the load support means by a slidable main attachment means which is attached to the boat or other load substantially at the center thereof. The slidable main attachment means engages the grooved support member in a manner which permits translation along the grooved support member. A rear attachment means may also be used to attach the rearward end or transom of the boat or other load when located substantially at the rearward end of the telescoping central rail means.

In the process of unloading a boat or other object, after the rearward end of the load support means is raised, the inner beams are extended, which pivots the front support downwardly, lowering the forward end of the telescoping central rail means. The forward extension of the inner beams also rotates the vertical support member downwardly and forwardly into a substantially horizontal loading and unloading position. The auxiliary support legs can be rotated into ground engagement to provide lateral stability at the forward end of the telescoping central rail means. The grooved support member carrying the boat or other load then can be slid downward and forward to the forward end of the inner beams, where the boat or other load may be detached and unloaded.

A winching means is provided to assist in the loading and unloading of the boat or other load. A biasing means may also be provided at the rearward connecting means to assist in raising the forward end of the telescoping central rail means after the load has been attached.

In an alternative embodiment of the present invention, the main attachment means is both pivotable and foldable so that the boat or other load may placed into numerous positions allowing selection of the position which best facilitates loading and unloading.

An additional alternative embodiment of the present invention reverses the apparatus thereby placing the load support means and the attached load over the rearward portion of the vehicle. In this embodiment, the forward end of the telescoping central rail means is pivotally attached to a substantially vertical support member, which is pivotally attached to the rearward end of the vehicle. In other details, this embodiment is virtually identical with other embodiments.

Another embodiment of the present invention uses a grooved support member that has center groove, and a rear attachment means that includes an adjustable braking means to allow control of the rate at which the boat or other load moves along the telescoping central rail means.

BRIEF DESCRIPTION OF THE DRAWINGS

FIG. 1 is a side elevational view of a preferred embodiment constructed in accordance with the present invention.

FIG. 1A is a side elevational view of an alternative preferred embodiment constructed in accordance with the present invention.

FIG. 3 is a partial perspective view of a main attachment means of a preferred embodiment constructed in accordance with the present invention.

FIG. 4 is a partial perspective view of a rearward connecting means, winch and framework of a preferred embodiment constructed in accordance with the present invention.

FIG. 4A is a partial perspective view of an alternative preferred embodiment constructed in accordance with the present invention.

FIG. 5 is a partial perspective view showing the winch mechanism of one alternative preferred embodiment constructed in accordance with the present invention.

FIG. 6 is a partial side elevation view of the rearward portion of a telescoping central rail means and rearward connecting means constructed in accordance with the present invention.

DETAILED DESCRIPTION OF PREFERRED EMBODIMENTS

Figure 2:
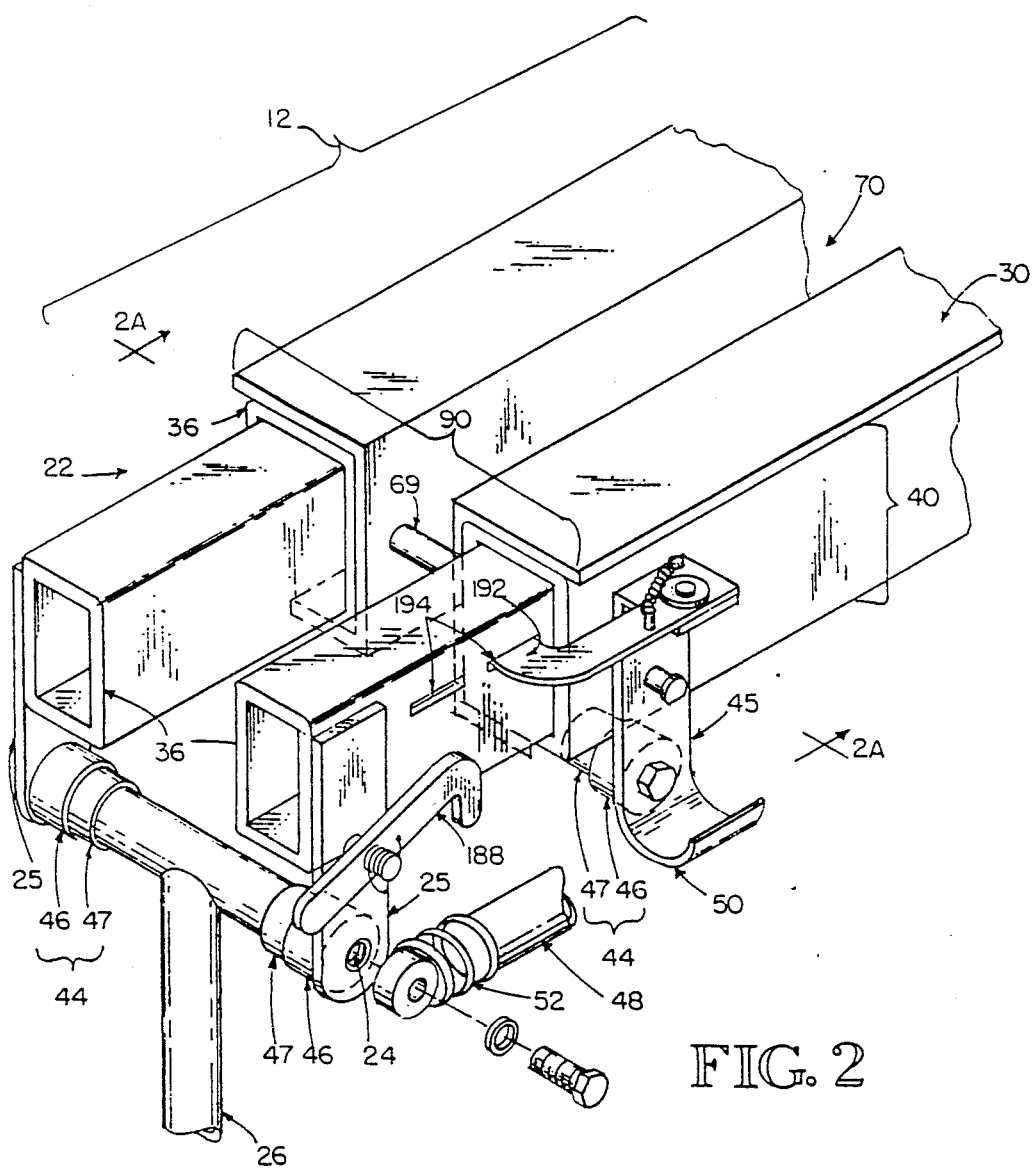
FIG. 2 is an enlarged partial perspective view of the forwardmost position of a telescoping central rail means constructed in accordance with the present invention.

With reference to FIG. 1, a preferred embodiment of the apparatus for loading, unloading, and carrying boats and other loads above the front portion of a vehicle is shown. The apparatus uses a load support means 10. The load support means 10 includes a telescoping central rail means 12 which is by a rearward connecting means 14 at or near its rearward end 16 to a lifting means 18, which, in turn, is attached to the middle portion of a vehicle, usually a truck 20. The rearward connecting means is illustrated in greater detail in FIGS. 4 and 6. The forward end 22 of the telescoping central rail means is pivotally attached at pivot 24 to a substantially vertical support member 26, which, in turn, is attached at pivot 28 to the bumper or other structure at the forward end of the truck.

As is best seen in FIG. 2, the telescoping central rail means 12 has a grooved support member 30, at least two hollow outer beams 32, and at least two inner beams 36. The grooved support member 30 has at least two longitudinal grooves 40, which extend substantially along the length of the grooved support member 30. As shown in FIGS. 1 and 2, the hollow outer beams 32 are slidably positioned within the longitudinal grooves 40 of the grooved support member 30. The grooved support member 30 is supported by one or more rollers 44 attached to the hollow outer beams 32 by brackets 45 permitting member 30 to readily move along beams 32. The rearward connecting means 14 connects the hollow outer beams 32 to the lifting means 18 at the rearward end of the telescoping central rail means 12, making the hollow outer beams 32 stationary relative to the longitudinal axis of the telescoping central rail means 12.

Inner beams 36 are slidably positioned within hollow outer beams 32 respectively. As illustrated in FIG. 2, the forward end of inner beams 36 are the components of the telescoping central rail means 12 attached to the upper end of the verical support means 26 at brackets 25. A pair of auxiliary support legs 48 are attached to brackets 25, which also carry pivot joint 24 that joining the inner beams 36 and the vertical support means 26. When not in use, the auxiliary support legs 48 are placed in holding brackets 50. When they are disengaged from brackets 50 for use, the auxiliary support legs 48 are biased outward by a biasing means 52. In the embodiment shown in FIG. 2, coiled spring connectors are used although other biasing means can be utilized, such as spring-loaded hinges or leaf springs.

Figures 2A, 2B:
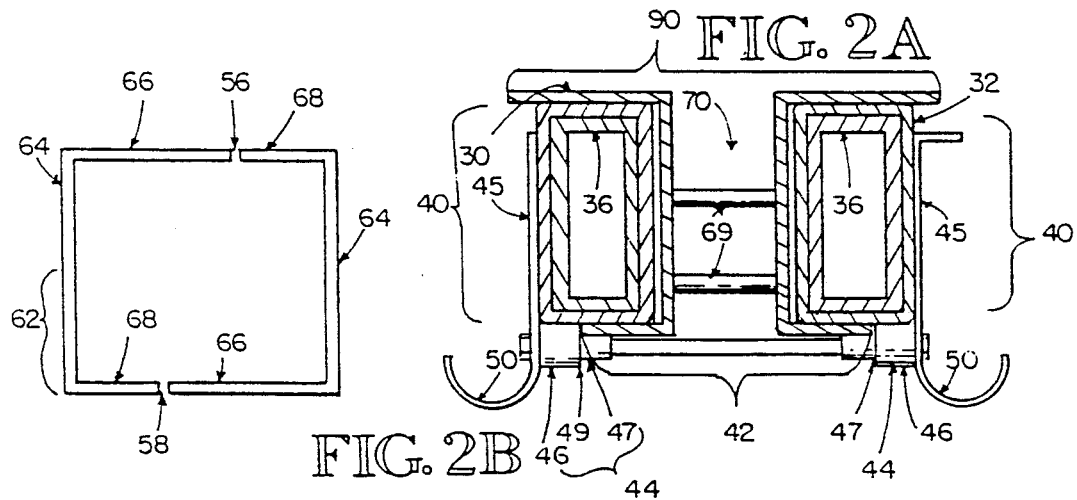
FIG. 2A is a partial cross-sectional view of a telescoping central rail means taken along lines 2A in FIG. 2.
FIG. 2B is a cross-sectional view of a tube useful in the manufacture of one embodiment of a grooved support member constructed according to this invention showing the cutting pattern needed to manufacture the device.

The grooved support member 30 may be constructed in a number of ways, including but not limited to extrusion, or may be constructed from separate pieces. One possible method of construction of the grooved support member 30 is illustrated in FIGS. 2A and 2B. A box beam 64 is cut longitudinally along opposite faces, at two points 56 and 58 offset from one another. Two identical longitudinal sections 60 and 62, result from cutting the box beam. Each longitudinal section has a complete side 64, a wide partial side 66, and a narrow partial side 68. To assemble the grooved support member, the longitudinal sections are turned so that the partial sides are extending outwardly with the wide partial sides on top and the narrow partial sides on bottom, and with the complete sides proximate each other. Once the longitudinal sections are oriented correctly, they are joined together by a fastening means. Shoulder rivets 69 are used in the present embodiment, but bolts, welding or other fastening means also can be used. This construction results in a support member 30 having a vertical longitudinal groove 70, extending substantially the length of the grooved support member between the longitudinal grooves, a wide upper web 90, a narrow lower web 92 all in a strong, torsion and flexure resistant light weight structure.

In FIG. 2, in addition to supporting the grooved support member, the rollers 44 are designed so that they help guide it as it slides back and forth during the operation of the apparatus. This function is accomplished with rollers which have an upper roller surface 46 and a lower roller surface 47. As assembled and shown in FIGS. 2 and 2A, the rollers are oriented with the upper rolling surfaces are positioned toward the outside or the telescoping central rail means or nearest the attachment brackets 45. With this orientation, the lower roller surfaces are nearest each other and form a slight depression 49 in set of rollers. As the grooved support member moves back and forth along the hollow outer beams, the lower narrower web 92 fits within this depression in the rollers at the same time as it is supported by the rollers. This assists in maintaining the grooved support members' motion and general axial alignment with the hollow outer beams at the inner beams.

As illustrated in FIGS. 4 and 6, the rearward connecting means 14 has a substantially horizontal pivoting means 72, and a substantially vertical pivoting means 74, as attached to a framework 84 which houses the lifting means 18 and a winching means 82, which will be described in more detail below. The rearward connecting means is attached to the hollow outer beams which are stationary, and the vertical legs 106 of the lifting means. The vertical pivoting means enables the telescopic central rail means and any attached load to rotate 360° about the vehicle. This allows the operator to load and unload any such load carried by the apparatus at different points around the vehicle.

As illustrated in FIG. 6, a biasing means 76 may be attached to the rearward end of the telescopic central rail means, which biases the forward end of the telescopic rail means to its upward position. The biasing means shown in FIG. 6 consists of a simple coiled leaf spring 78 which has one end 80 attached to the hollow outer beam and the other end 81 pressing against the rearward connecting means.

A winching means 82 is illustrated in FIGS. 4-6. A framework 84 is used to house the winching means 82. In the sides of the framework 84, slots 86 are provided to allow a securing means (not shown) such as elastic cords, turnbuckles or overcenter latches to attach the gunwales or other structures of the boat securely to the framework 84. As shown in FIG. 1, the framework may also have auxiliary structural members 87 to more securely attach the framework to the vehicle. The winch 88 is covered with a hinged door 100 which is slotted to allow the winch cable 102 to move as the winch operates with the door closed. The winch cable is preferably attached within the vertical longitudinal groove 70 of the grooved support member 30 to one of the shoulder rivets 69 substantially toward the grooved support member's forward end.

The lifting means 104, which operates to lift the vertical legs 106, is located within the framework 84 that houses the winch. The lifting means and the winch can be operated by one set of common controls. The first shaft 108 is attached to a drum mechanism 110 which selects the direction that the winch may turn. The second shaft 112 selects whether the winch or lifting means is locked or operable relatively in one rotational direction or the other. The third shaft 114 operates the lifting means to raise and lower the mechanism. The embodiment shown uses mechanical winch and lifting means. Electric or hydraulic drive means could also be used. Similarly, electrical controls and drive means could be used to operate the winch and lifting means.

The vertical legs 106 can be lowered until they are completely within framework 84, as shown in FIG. 4A. When the apparatus is not being used to carry loads, the vertical legs can be withdrawn and a windscreen 116 can be attached to the framework by attaching vertical members 118 to the vertical legs. This improves the aerodynamics of the vehicle.

To ensure that the sliding surfaces operate smoothly, the facing surfaces can be coated occasionally with temporary means such as grease or graphite sprays, or the surfaces can be permanently coated with a low friction material, such as plastic. In addition, thin wear surface pads constructed of a plastic such as polyethylene or Teflon can be used.

While the grooved support member, the outer and inner beams are shown as having square or rectangular cross-sections, other shapes could also work. For example, the same components could have circular or oval cross-sections as long as they also could be slidably fit together. A boat 120, is carried by the load support means, although other loads such as snowmobiles and compact off-road vehicles could also be carried on a suitably reinforced and constructed embodiment of invention. To load and carry a boat, the boat is connected to the telescoping central rail means 12 by a main attachment means 122. The attachment means is connected to the boat gunwales at approximately the center of gravity of the boat. The attachment means 122 is then slidably attached to the grooved support member 30 and slides upon upper web 90.

One embodiment of the main attachment means 122 is illustrated in detail in FIG. 3. A "C" shaped clamping device 124 sized to fit upon and slide along the upper web 90 of the grooved support member 30. A 360° pivot 126 attaches the clamping device to the reat of the attachment means. Attached to the top of pivot 126 is a support plate 128. To two opposing sides 130 of the support plate 128, two folding link devices 132 are pivotal attached. To the opposite end of each folding link device 132, a mounting plate 134 is pivotally attached. When the mounting brackets are attached to the folding devices, their inner surfaces 136 are substantially parallel. A crossbeam 138 has its ends 140 releasably attached to the gunwales of the boat. In turn, the crossbeam, which has at least two apertures (not shown) through its width near one face, is attached to the mounting brackets by aligning the holes in the crossbeam with holes 146 through the mounting brackets and passing retaining pins or bolts through both sets of holes. By supplying different sets of holes in the mounting brackets, the height of the boat as it rides on the telescoping central rail means can be adjusted.

Figure 7:
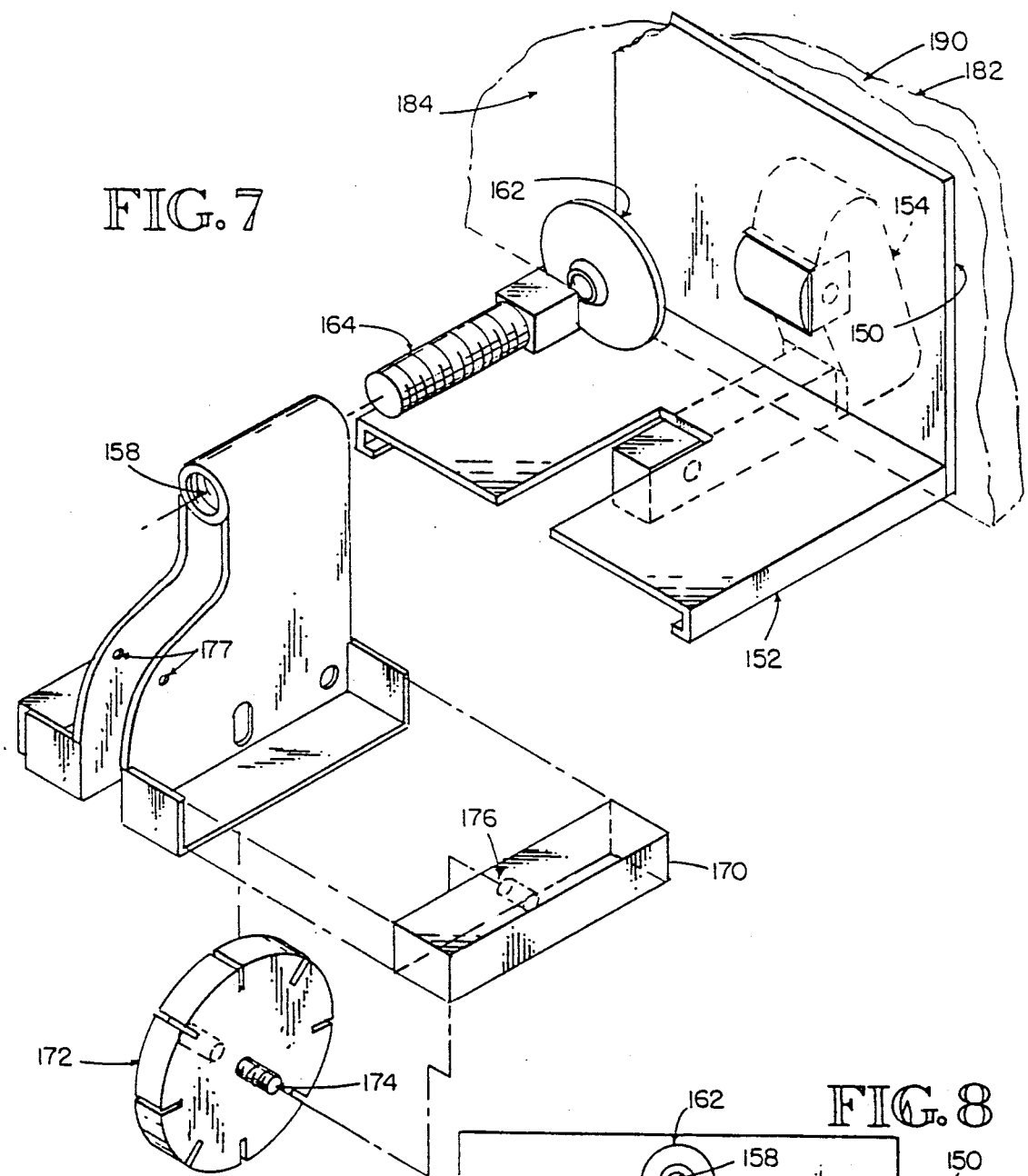
FIG. 7 is an exploded perspective view showing the rear attachment means of an alternative preferred embodiment constructed in accordance with the present invention.
Figure 8:
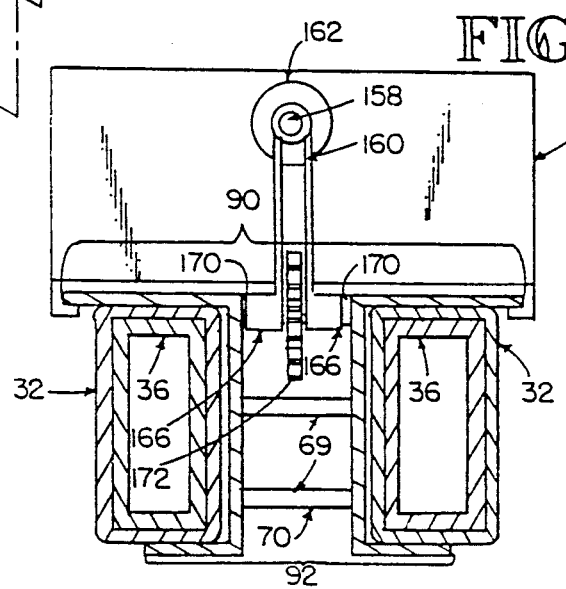
FIG. 8 is a cross-sectioned view of the assembled rear attachment means and telescoping central rail means of a preferred alternative embodiment constructed in accordance with the present invention.

A rear or transom attachment means 148 also is provided with the apparatus. An embodiment of the rear attachment means is illustrated in FIGS. 7 and 8. This embodiment uses a rear plate 150 which is attached to a rear clamping device 152 by a rear bracket 154 which allows the rear plate to adjust and accommodate for the angle of the transom of the boat. The bottom of the rear bracket 154 fits into the vertical longitudinal groove 70 of grooved support member 30 while the rear clamping device 152 slides upon upper web 90. An upstanding structural member 160 is attached to the rear bracket 154 and to the rear clamping device 152.

A threaded aperture 158, which is substantially aligned with the longitudinal axis of the load support means, is located substantially at the top of the structural member 160. A clamping pad 162 with a threaded adjusting means 164 is used clamping the transom of the boat to the rear plate 152, and thereby secure the transom of the boat to the boat carrier.

The lower shelves 166 of the structural member 160 form pockets when the structural member is attached to the clamping device 152. Braking pads 170 are placed within the pockets, and are held in place and adjusted by an adjusting means using a wheel 172 placed in the structural member with right-and left-handed threaded screws 174 extending normally from the opposing faces of the wheel, which screws fit into threaded apertures 176 in the brake pads. The wheel can be locked in place by a pin (not shown) which is passed through hole 177 after the adjustment is completed.

In practice, the transom attachment means is arranged so that when the boat is in position the inner transom surface 182 rests against the rear plate 150. The clamping pad 162 is tightened against the outside transom surface 184 using a threaded adjusting means which is oriented toward the rearward end of the telescopic central rail means.

To operate the apparatus, the lifting means first is used to lift the rear of the telescoping central rail means and the boat. The primary safety latch mechanism 192, which is a double toggle latch with an engaged position (shown in FIG. 2) and a disengaged position (not shown) and the secondary safety latch mechanism 188 then are disengaged which allows the inner beams 36 and 38 to slide forward. As shown in FIG. 1, as the inner beams slide forward, the vertical support member 26 is rotated from its substantially vertical orientation to a substantially horizontal orientation, which lower the forward end of the inner beams thereby lowering the forward end of the entire load support means.

The winch 88 is then engaged and the grooved support member and the boat slide along the hollow outer beams 32 and 34 and the inner beams. As the grooved support member slides along the hollow outer beams, the depression 49 in the roller surfaces help keep it axially aligned (see FIG. 2A). When the grooved support member 30 has reached the end of its travel, the boat with its main (see FIG. 3) and rear attachment means slide along the length of the grooved support member until its forward end is reached by the clamping device of the main attachment means. The downward motion of the boat is controlled by the brake pads (see FIGS. 7 and 8).

To detach the boat from the loading mechanism, the tension from the clamping pad 162 then is released on the transom 190 by turning the threaded adjusting means 164. The boat may be rotated then until its longitudinal axis is substantially normal to the longitudinal axis of the loading apparatus. The boat is rotated about its longitudinal axis until it is upright when the retaining pins are removed freeing the boat from the main attachment. The boat may be unloaded on the ground or directly onto water.

To load the boat, the process is reversed, attaching the boat to the main attachment means 122, rotating the boat about its longitudinal axis into an upside down position, and then pivoting the boat about a central axis until its longitudinal axis is substantially aligned with the longitudinal axis of the grooved support member 30. The stern of the boat is then engaged within the rear attachment means.

After the clamping pad is tightened, the winch is reversed and the grooved support member is pulled toward the rear of the hollow outer beams. As the grooved support member is slid rearward by the winching means, the boat or other load moves up the telescoping central rail means. Since the winch cable is attached substantially towards the forward end of the grooved support member, the grooved support member in the attached mode can be slid rearward until the center of mass of the telescoping central rail means and the attached boat is rearward of the horizontal pivoting means of the rearward connecting means.

With the grooved support member and attached boat in this position, the telescoping central rail means has biased toward its upper position, and together with the additional biasing means 78, raising the forward end of the telescoping central rail means is rendered relatively easy for one operator. Once the grooved support member and attached boat have been placed in this upwardly biased position, the operator can then begin pushing the inner beams into the hollow outer beams. The primary safety latch is engaged so that the latch 192 fits into the plurality of slots 194 in the side of the inner beams, thereby preventing the inner beams from accidently extending while the operator is pushing them back into the retracted position in the hollow outer beams. After the inner beams have been retracted and both safety latches closed, the lifting means lowers the rear of the telescoping central rail means and the boat with its attachment means is slid forward to eliminate the upward bias and securing means attached to the slots in the winch framework.

The vertical pivoting means 74 of the rearward connecting means 14 enables the central telescoping central rail means and attached load to be rotated 360° about the pivoting means and thereby the vehicle. As illustrated in FIG. 1A, this enables the boat or other load to be carried over the rearward portion of a vehicle. In this embodiment, the load carrying apparatus is oriented so that the telescoping central rail means 202 is oriented with its forward end 204 directed towards the rear of the vehicle. The rearward connecting means 206 is actually oriented to toward the forward end of vehicle. As shown, the forward end 204 of the telescoping central rail means is pivotally attached to a substantially vertical support member 210 and is in turn pivotally attached to the rearward end of the vehicle.

If the operator desires to load or unload a boat at some point other than that direction in which the forward end of the telescoping central rail means is attached to the vehicle, then the grooved support member and attached boat can be slid rearward until the center of mass of the telescopic central rail means and the attached boat is oriented so that there is a slight upward bias on the telescoping central rail means. The operator can then detach the substantially vertical member from either the front or the rear of the vehicle, rotate the telescoping central rail means to the point at which he wishes to unload the boat, and at that point, slid the inner beams forward until the auxiliary support legs can be placed on the ground. After that the loading and unloading procedures are identical to those described above.

INDUSTRIAL APPLICABILITY

This invention finds application in the loading, unloading and transport of devices such as small boats and vehicles, and is particularly applicable wherever there is a need for such devices which may be operated by a single individual.

Other variations and embodiments of the present invention are contemplated. Those skilled in the art will readily appreciate such variations upon carefully reviewing the above disclosure. Therefore, the present invention is not to be limited by the above description, but is to be determined in the scope of the claims which follow.

What is claimed is:

1. An apparatus capable of being mounted in a vehicle for loading and carrying loads above a vehicle comprising:
    a load support means with forward and rearward ends for carrying a load, said support means being longitudinally extensible;
    an attachment means mounted for longitudinal movement along said load support means for attaching said loads thereto;
    a forward connecting means for pivotally connecting said load support means forward end to an end portion of a vehicle;
    a rearward connecting means for pivotally connecting said load support means rearward end to a middle portion of a vehicle;
    a lifting means located adjacent to said rearward end of said load support means, for raising and lowering said rearward end of said load support means; and
    a means for lowering and forwardly extending said forward end of said load support means;
    wherein said forward connecting means rotates through a vertical plane and acting in concert with said extensible load support means for permitting operation of said means for lowering and forwardly extending said forward end of said load support means.

2. An apparatus for loading and carrying loads as claimed in claim 1, wherein said extensible load support means further comprises:
    a telescoping central rail means having forward and rearward ends with a grooved support member having at least one elongated longitudinal groove extending from adjacent said forward end to adjacent said rearward end of said rail means, at least one hollow outer beam with forward and rearward ends with one said hollow outer beam slidably fit within each said longitudinal groove, at least one inner beam with forward and rearward ends with one said inner beam slidably fit within each said hollow outer beam, with said rearward end of said hollow outer beam being connected to said rearward connecting means and said rearward connecting means being connected to said lifting means, and a winching means attached to said grooved support member.

3. An apparatus for loading and carrying loads as claimed in claim 2, wherein said moveable attachment means includes a clamping device slidably attached to said grooved support member, and a load attachment means which both pivots and folds relative to said clamping device, whereby any load attached to said load attaching means can be rotated relative to said telescoping central rail means and can be moved away from central rail means and can be moved away from said longitudinal axis of said telescoping central rail means by unfolding said load attachment means.

4. An apparatus for loading and carrying loads as claimed in claim 3, wherein said forward connecting means further comprises a substantially vertical support member having upper and lower ends with said upper end pivotably attached to said telescoping central rail means forward end and said lower end having a pivotal attachment means for attachment to a vehicle, so that as said inner beams telescopically extend from said forward end of said telescoping central rail means, said vertical support upper end rotates about said vertical support lower end, placing said vertical support member in a substantially horizontal orientation thereby lowering said forward end of said telescoping central rail means.

5. An apparatus for loading and carrying loads as claimed in claim 4, wherein said rearward connecting means further comprises a substantially horizontal pivoting means and a substantial vertical pivoting means so that the lifting means raises said telescoping central rail means rearward and the said rearward end will rotate about said substantially horizontal pivoting means and said telescoping central rail means can rotate 360° about said substantially vertical pivoting means.

6. An apparatus for loading and carrying loads as claimed in claim 5, wherein said apparatus further comprises at least one auxiliary support leg pivotally attached to said vertical support member upper end so that when said vertical support member is in a substantially horizontal orientation, said auxiliary support leg can be rotated about said pivotal attachment and used to support and stabilize said central telescoping central rail means.

7. An apparatus for loading and carrying loads as claimed in claim 6, said apparatus further comprises:
    a rear attachment means having a second clamping device slidably connected to said grooved support member, a rear plate and at least one clamping pad attached to said second clamping device which can be adjusted to hold a rearward portion of a load, and a braking means which controls the rate at which any load attached to said rear attachment means can slide along said telescoping central rail means.

8. The apparatus as claimed in claim 7, wherein said apparatus further comprises:
    a framework having a housing, said housing containing both said winching means and said lifting means, with a control means to operate both said winching means and said lifting means from a single operating station, and with at least one vertical support leg to connect said lifting means and said framework to said rearward connecting means.

9. An apparatus for loading and carrying loads as claimed in claim 8, wherein said framework further comprises:
a means for attaching an aerodynamic device to said framework when said load support means is not attached to said framework.

10. An apparatus capable of being mounted in a vehicle for loading and carrying loads above the vehicle comprising:
a load support means for forward and rearward ends;
a telescoping central rail means having forward and rearward ends with a grooved support member having at least two longitudinal grooves extending from adjacent said forward end to adjacent said rearward end of said rail means, a vertical longitudinal groove located between said longitudinal grooves and extending substantially along a length of said rail means, at least two hollow outer beams with forward and rearward ends with one said hollow outer beam slidably fit in each said longitudinal groove, at least two inner beams with forward and rearward ends with one said inner beam slidably fit in each said hollow outer beam;
a forward connecting means for connecting said telescoping central rail means forward end to a vehicle having a substantially vertical support member with upper and lower ends and with said vertical support member upper end pivotally attached to said telescoping central rail means forward end and said vertical support member lower end having a pivotal attachment means for attachment to a vehicle;
a rearward connecting means for connecting said telescoping central rail means rearward end to a vehicle, said rearward connecting means having a substantially vertical pivoting means and a substantially horizontal pivoting means;
a lifting means locating substantially near said telescoping central rail means rearward end and being connected to said rearward end by said rearward connecting means, thereby enabling said rearward end of said telescoping central rail means to be raised and lowered;
a main attachment means having a first clamping device slidably attached to said grooved support member, having a load attachment means which both pivots and folds relative to said first clamping device whereby any load attached to said load attaching means can be rotated relative to said telescoping central rail means and can be moved away from a longitudinal axis of said telescoping central rail means by unfolding said load attachment means;
a rearward attachment means having a second clamping device slidably connected to said grooved support member, a rear plate and at least one clamping pad attached to said second clamping device which can be adjusted to hold a rearward portion of the load, and a braking means which controls the rate at which any load attached to said rearward attachment means can slide along said telescoping central rail means;
at least one auxiliary support leg pivotally attached to said vertical support member upper end so that when said vertical support member is at a substantially horizontal orientation, said auxiliary support leg can be rotated to contact with the ground stabilizing said telescoping central rail means; and
a framework having a housing, said housing containing a winching means to assist in loading and unloading, said lifting means from a single operating station and with at least one vertical leg connecting said framework and said lifting means to said framework connecting means.

* * * * *